US006470337B1

United States Patent
Nihei (10) Patent No.: US 6,470,337 B1
(45) Date of Patent: Oct. 22, 2002

(54) INFORMATION RETRIEVAL SYSTEM USING A HIERARCHICAL INDEX FOR NARROWING A RETRIEVAL RESULT AND ITS METHOD AND STORING MEDIUM WITH INFORMATION RETRIEVAL PROGRAM STORED THEREIN

(75) Inventor: Katsumi Nihei, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/466,788

(22) Filed: Dec. 20, 1999

(30) Foreign Application Priority Data

Dec. 24, 1998 (JP) .......................................... 10-376814

(51) Int. Cl.⁷ .............................................. G06F 17/30
(52) U.S. Cl. .................................... 707/5; 707/2; 707/7
(58) Field of Search .......................................... 707/1–7

(56) References Cited

U.S. PATENT DOCUMENTS

| | | | |
|---|---|---|---|
| 5,978,789 A | * 11/1999 | Griffin et al. .................... | 707/2 |
| 6,263,334 B1 | * 7/2001 | Fayyad et al. ................... | 707/5 |
| 6,330,552 B1 | * 12/2001 | Farrar et al. ................. | 705/400 |
| 6,351,742 B1 | * 2/2002 | Agarwal et al. ................ | 707/3 |
| 6,363,371 B1 | * 3/2002 | Chaudhuri et al. ............. | 707/2 |

FOREIGN PATENT DOCUMENTS

| | | |
|---|---|---|
| JP | 4-114277 | 4/1992 |
| JP | 7-65020 | 3/1995 |
| JP | 10-187739 | 7/1998 |

OTHER PUBLICATIONS

Nihei et al., "Diagnosis Function of Diagnosis–type WWW Information Search System (3)", *The 55th Institute of Information Processing National Conference, Collection of Speeches and Papers*, Sep. 24, 1997, pp. 418–419—No Translation (Japanese Language).

* cited by examiner

*Primary Examiner*—Maria N. Von Buhr
(74) *Attorney, Agent, or Firm*—Sughrue Mion, PLLC (57) ABSTRACT

An information retrieval system for retrieving desired data from a retrieved subject database with data to be retrieved stored therein, which obtains the index corresponding to the retrieved subject data obtained by the retrieval executing unit as a retrieval result, from the index storing unit, computes expected value of acquired information based on the retrieval times of the retrieval result data stored in the retrieved subject retrieval probability storing unit, presents to a user the index information corresponding to the retrieval result in decreasing order of the expected value of the computed acquired information as for the retrieved subject data that is the retrieval result, and narrows down a retrieval result obtained by the retrieval executing unit, in reply to a user's narrowing request.

21 Claims, 6 Drawing Sheets

INFORMATION RETRIEVAL SYSTEM USING A HIERARCHICAL INDEX FOR NARROWING A RETRIEVAL RESULT AND ITS METHOD AND STORING MEDIUM WITH INFORMATION RETRIEVAL PROGRAM STORED THEREIN

BACKGROUNDS OF THE INVENTION

1. Field of the Invention

The present invention relates to an information retrieval system, and more particularly to an information retrieval system that can narrow down a retrieval result by use of hierarchical index of a subject to be retrieved and its method, and a storing medium with an information retrieval program stored therein.

2. Description of the Related Art

When retrieving desired information through access to a database, a user inputs some retrieval condition so as to get the retrieval result. When there exist a lot of retrieval results, he or she further enters an additional retrieval condition, depending on necessity, so to narrow the search.

In the information retrieval by the conventional information retrieval system, since any retrieval condition is entered by a user, he or she would repeat trial and error while adding a retrieval condition or deleting it, until getting a properly-narrowed retrieval result.

Then, some techniques for supporting decision of a retrieval condition in the information retrieval have been proposed so far. As this kind of technique, there are a technique of setting a key word index to each information that is disclosed in the Japanese Patent Publication Laid-Open (Kokai) No. Heisei 7-65020, and an information retrieval system of presenting retrieval conditions for narrowing a search by a hierarchical index, to a user, that is disclosed in the Japanese Patent Publication Laid-Open (Kokai) No. Heisei 4-114277.

These conventional techniques for supporting decision of a retrieval condition, however, are only to present an index means established based on the information stored in a database that is a subject to be retrieved, and they have no means for presenting retrieval conditions one after another from the most efficient condition for narrowing a retrieval result according to the retrieval probability of information and a hierarchical index.

As mentioned above, the conventional information retrieval system has no means for supporting decision of a retrieval condition to be added for narrowing a retrieval result, or, if it has, the conventional system cannot present retrieval conditions one after another from the most efficient condition for narrowing a retrieval result based on the retrieval probability of the information.

Therefore, when there is no means for supporting decision of a retrieval condition, a user has to select a proper retrieval condition while repeating trial and error, and even when there is the means for supporting decision of a retrieval condition, the conventional system cannot decide a proper retrieval condition efficiently.

SUMMARY OF THE INVENTION

In order to solve the above mentioned problem, the present invention aims to provide an information retrieval system capable of deciding a proper retrieval condition efficiently and narrowing down a search into a proper result by presenting nodes of hierarchical index in the most effective order for narrowing down a retrieval result, and provide its method and a storing medium with such an information retrieval program stored therein.

According to the first aspect of the invention, an information retrieval system for retrieving desired data from a retrieved subject database with data to be retrieved stored therein, comprises retrieval condition expression creating means for creating a retrieval condition expression by use of an entered retrieval condition, retrieval executing means for executing retrieval processing through access to the retrieved subject database based on a retrieval condition expression created by said retrieval condition expression creating means, index storing means for storing each hierarchical index as for retrieved subject data stored in the retrieved subject database, retrieved subject retrieval probability storing means for storing record of retrieval times of each retrieved subject data stored in the retrieved subject database, and narrowing means of obtaining the index corresponding to the retrieved subject data obtained by said retrieval executing means as a retrieval result, from said index storing means, computing expected value of acquired information based on the retrieval times of the retrieval result data stored in said retrieved subject retrieval probability storing means, and presenting to a user the index information corresponding to the retrieval results, in decreasing order of the expected value of the computed acquired information as for the retrieved subject data that is the retrieval result, for narrowing down a retrieval result obtained by said retrieval executing means, in reply to a user's narrowing request.

In the preferred construction, the information retrieval system further comprises retrieval condition receiving means for receiving a user's input of a retrieval condition, and retrieval result display means for displaying a retrieval result obtained from the retrieval processing by said retrieval executing means.

In another preferred construction, said narrowing means obtains, from the hierarchical index stored in said index storing means, a question node that is a node positioned at the lowest hierarchy, of the common nodes in all the paths, and an answer node that is a node positioned at a lower hierarchy right beneath the question node, assuming a path starting from a leaf indexed to the retrieved subject data obtained by said retrieval executing means as a retrieval result and tracing the nodes of hierarchical index up to the upper hierarchy, computes the expected value of the acquired information as for the respective obtained question nodes, and presents to a user the question nodes in decreasing order of the expected value of the computed acquired information and the answer nodes corresponding to the respective question nodes, and further said narrowing means computes information amount M(C) of collection C of the retrieved subject data by the following expression, assuming that the collection of the retrieved subject data that is a retrieval result by said retrieval executing means is defined as C, by use of the number k of the retrieved subject data that is the retrieval result and the existence ratio Pj of the retrieved subject data j of the collection C of the retrieved subject data, $$M(C) = -\sum_{j=1}^{k} P^j \log_2 P^j$$

computes the expected information amount B (C, a) when the collection C is divided into partial collections C1, ..., Cn based on the answer nodes a1, ..., an as for the given question node a, by the following expression, $$B(C, a) = \sum_{i=1}^{n} \frac{|C_i|}{|C|} M(C_i)$$

and computes the expected value gain (C, a) of the acquired information of the respective question nodes, by the following expression.

$$\text{gain}(C,a) = M(C) - B(C,a)$$

In another preferred construction, said narrowing means makes the existence ratio Pj of the retrieved subject data j in the collection C, as the retrieval probability pj of the retrieved subject data rj that is computed by the following expression, by use of the number k of the retrieved subject data that is a retrieval result by said retrieval executing means, the retrieved subject data r1, r2, ..., rm that is the retrieval result, the retrieval times hj of the given retrieved subject data rj ($1 \leq j \leq m$), and the number of times vj the retrieval result appears at a lower hierarchy below a different answer node.

$$p^j = \frac{h_j}{v_j \sum_{i=1}^{k} h_j}$$

In another preferred construction, said narrowing means obtains, from the hierarchical index stored in said index storing means, a question node that is a node positioned at the lowest hierarchy, of the common nodes in all the paths, and an answer node that is a node positioned at a lower hierarchy right beneath the question node, assuming a path starting from a leaf indexed to the retrieved subject data obtained by said retrieval executing means as a retrieval result and tracing the nodes of hierarchical index up to the upper hierarchy, computes the expected value of the acquired information as for the respective obtained question nodes, presents to a user the question nodes in decreasing order of the expected value of the computed acquired information and the answer nodes corresponding to the respective question nodes, and according to a narrowing instruction entered by a user, creates a partial retrieval condition for retrieving only the lower hierarchy below the answer node selected by the narrowing instruction, in the hierarchical index, so to hand the same condition to said retrieval condition expression creating means, while said retrieval condition expression creating means converts the retrieval condition into an expression processable by said retrieval executing means by use of the partial retrieval condition expression when receiving the partial retrieval condition expression from said narrowing means, in addition to creation of a retrieval condition expression based on the retrieval condition entered by said retrieval condition receiving means.

In another preferred construction, said narrowing means, according to a narrowing instruction entered by a user, creates a partial retrieval condition for retrieving only the lower hierarchy below the answer node selected by the narrowing instruction, in the hierarchical index, so to hand the same condition to said retrieval condition expression creating means, while said retrieval condition expression creating means converts the retrieval condition into an expression processable by said retrieval executing means by use of the partial retrieval condition expression when receiving the partial retrieval condition expression from said narrowing means, in addition to creation of a retrieval condition expression based on the retrieval condition entered by said retrieval condition receiving means.

In another preferred construction, said narrowing means makes the existence ratio Pj of the retrieved subject data j in the collection C as the retrieval probability pj of the retrieved subject data rj that is computed by the following expression, by use of the number k of the retrieved subject data that is a retrieval result by said retrieval executing means, the retrieved subject data r1, r2, ..., rm that is the retrieval result, the retrieval times hj of the given retrieved subject data rj ($1 \leq j \leq m$), and the number of times vj the retrieval result appears at a lower hierarchy below a different answer node, $$p^j = \frac{h_j}{v_j \sum_{i=1}^{k} h_j}$$

and, according to a narrowing instruction entered by a user, creates a partial retrieval condition for retrieving only the lower hierarchy below the answer node selected by the narrowing instruction, in the hierarchical index, so to hand the same condition to said retrieval condition expression creating means, while said retrieval condition expression creating means converts the retrieval condition into an expression processable by said retrieval executing means by use of the partial retrieval condition expression when receiving the partial retrieval condition expression from said narrowing means, in addition to creation of a retrieval condition expression based on the retrieval condition entered by said retrieval condition receiving means.

According to the second aspect of the invention, an information retrieval method for retrieving desired data from a retrieved subject database with data to be retrieved stored therein, comprising the following steps of:

performing retrieval processing in an arbitrary retrieval method, obtaining the index information corresponding to the retrieved subject data obtained as a retrieval result, from the hierarchical indexes as for the retrieved subject data stored in said retrieved subject database, obtaining the number of retrieval times of the retrieved subject data obtained as the retrieval result, of the record of the retrieval times of each retrieved subject data stored in said retrieved subject database, computing expected value of acquired information based on the obtained retrieval times, presenting to a user the index information corresponding to the retrieval results, in decreasing order of the expected value of the computed acquired information as for the retrieved subject data that is the retrieval result, and narrowing down the retrieval result in reply to a user's narrowing request.

In the preferred construction, said narrowing step includes a step of obtaining, from the hierarchical index, a question node that is a node positioned at the lowest hierarchy, of the common nodes in all the paths, and an answer node that is a node positioned at a lower hierarchy right beneath the question node, assuming a path starting from a leaf indexed to the retrieved subject data obtained as a retrieval result and tracing the nodes of hierarchical index up to the upper hierarchy, a step of computing the expected value of the acquired information as for the respective obtained question nodes, and a step of presenting to a user the question nodes in decreasing order of the expected value of the computed acquired information and the answer nodes corresponding to the respective question nodes.

In another preferred construction, said narrowing step includes a step of obtaining, from the hierarchical index, a question node that is a node positioned at the lowest hierarchy, of the common nodes in all the paths, and an answer node that is a node positioned at a lower hierarchy right beneath the question node, assuming a path starting from a leaf indexed to the retrieved subject data obtained as a retrieval result and tracing the nodes of hierarchical index up to the upper hierarchy, a step of computing the expected value of the acquired information as for the respective obtained question nodes, and a step of presenting to a user the question nodes in decreasing order of the expected value of the computed acquired information and the answer nodes corresponding to the respective question nodes, and said step of computing the expected value of the acquired information includes a step of computing information amount M(C) of collection C of the retrieved subject data by the following expression, assuming that the collection of the retrieved subject data that is a retrieval result is defined as C, by use of the number k of the retrieved subject data that is the retrieval result and the existence ratio Pj of the retrieved subject data j of the collection C of the retrieved subject data, $$M(C) = -\sum_{j=1}^{k} P^j \log_2 P^j$$

a step of computing the expected information amount B (C, a) when the collection C is divided into partial collections C1, . . . , Cn based on the answer nodes a1, . . . , an as for the given question node a, by the following expression, $$B(C, a) = \sum_{i=1}^{n} \frac{|C_i|}{|C|} M(C_i)$$

and a step of computing the expected value gain (C, a) of the acquired information of the respective question nodes, by the following expression.

$$\text{gain}(C,a) = M(C) - B(C,a)$$

In another preferred construction, in said step of computing the information amount M(C) of the collection C of the retrieved subject data, the existence ratio Pj of the retrieved subject data j in the collection C is made as the retrieval probability pj of the retrieved subject data rj that is computed by the following expression, by use of the number k of the retrieved subject data that is a retrieval result by said retrieval executing means, the retrieved subject data r1, r2, . . . , rm that is the retrieval result, the retrieval times hj of the given retrieved subject data rj ($1 \leq j \leq m$), and the number of times vj the retrieval result appears at a lower hierarchy below a different answer node.

$$p^j = \frac{h_j}{v_j \sum_{i=1}^{k} h_j}$$

According to the third aspect of the invention, a computer readable memory storing an information retrieval program for retrieving desired data from a retrieved subject database with data to be retrieved stored therein while controlling a computer system, in which said information retrieval program includes the following steps of:

performing retrieval processing in an arbitrary retrieval method, obtaining the index information corresponding to the retrieved subject data obtained as a retrieval result, from the hierarchical indexes as for the retrieved subject data stored in said retrieved subject database, obtaining the number of retrieval times of the retrieved subject data obtained as the retrieval result, of the record of the retrieval times of each retrieved subject data stored in said retrieved subject database, computing expected value of acquired information based on the obtained retrieval times, presenting to a user the index information corresponding to the retrieval results, in decreasing order of the expected value of the computed acquired information as for the retrieved subject data that is the retrieval result, and narrowing down the retrieval result in reply to a user's narrowing request.

According to another aspect of the invention, an information retrieval system for retrieving desired data from a retrieved subject database with data to be retrieved stored therein based on a retrieval condition expression, comprises retrieved subject retrieval probability storing means for storing record of retrieval times of each retrieved subject data stored in the retrieved subject database, and narrowing means of obtaining the index corresponding to the retrieved subject data obtained as a retrieval result, from said index storing means storing hierarchical indexes as for the retrieved subject data stored in said retrieved subject database, computing expected value of acquired information based on the retrieval times of the retrieval result data stored in said retrieved subject retrieval probability storing means, and presenting to a user the index information corresponding to the retrieval result, in decreasing order of the expected value of the computed acquired information as for the retrieved subject data that is the retrieval result, for narrowing down a retrieval result obtained by said retrieval executing means, in reply to a user's narrowing request.

In the preferred construction, said narrowing means obtains, from the hierarchical index stored in said index storing means, a question node that is a node positioned at the lowest hierarchy, of the common nodes in all the paths, and an answer node that is a node positioned at a lower hierarchy right beneath the question node, assuming a path starting from a leaf indexed to the retrieved subject data obtained as a retrieval result and tracing the nodes of hierarchical index up to the upper hierarchy, computes the expected value of the acquired information as for the respective obtained question nodes, and presents to a user the question nodes in decreasing order of the expected value of the computed acquired information and the answer nodes corresponding to the respective question nodes.

In another preferred construction, said narrowing means obtains, from the hierarchical index stored in said index storing means, a question node that is a node positioned at the lowest hierarchy, of the common nodes in all the paths, and an answer node that is a node positioned at a lower hierarchy right beneath the question node, assuming a path starting from a leaf indexed to the retrieved subject data obtained as a retrieval result and tracing the nodes of hierarchical index up to the upper hierarchy, computes the expected value of the acquired information as for the respective obtained question nodes, and presents to a user the question nodes in decreasing order of the expected value of the computed acquired information and the answer nodes corresponding to the respective question nodes, and further said narrowing means computes information amount M(C) of collection C of the retrieved subject data by the following expression, assuming that the collection of the retrieved subject data that is a retrieval result is defined as C, by use of the number k of the retrieved subject data that is the retrieval result and the existence ratio Pj of the retrieved subject data j of the collection C of the retrieved subject data, $$M(C) = -\sum_{j=1}^{k} P^j \log_2 P^j$$

computes the expected information amount B (C, a) when the collection C is divided into partial collections C1, . . . , Cn based on the answer nodes a1, . . . , an as for the given question node a, by the following expression, $$B(C, a) = \sum_{i=1}^{n} \frac{|C_i|}{|C|} M(C_i)$$

and computes the expected value gain (C, a) of the acquired information of the respective question nodes, by the following expression.

gain(C,a)=M(C)−B(C,a)

In another preferred construction, said narrowing means makes the existence ratio Pj of the retrieved subject data j in the collection C, as the retrieval probability pj of the retrieved subject data rj that is computed by the following expression, by use of the number k of the retrieved subject data that is a retrieval result, the retrieved subject data r1, r2, . . . , rm that is the retrieval result, the retrieval times hj of the given retrieved subject data rj (1≤j≤m), and the number of times vj the retrieval result appears at a lower hierarchy below a different answer node.

$$p^j = \frac{h_j}{v_j \sum_{i=1}^{k} h_j}$$

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
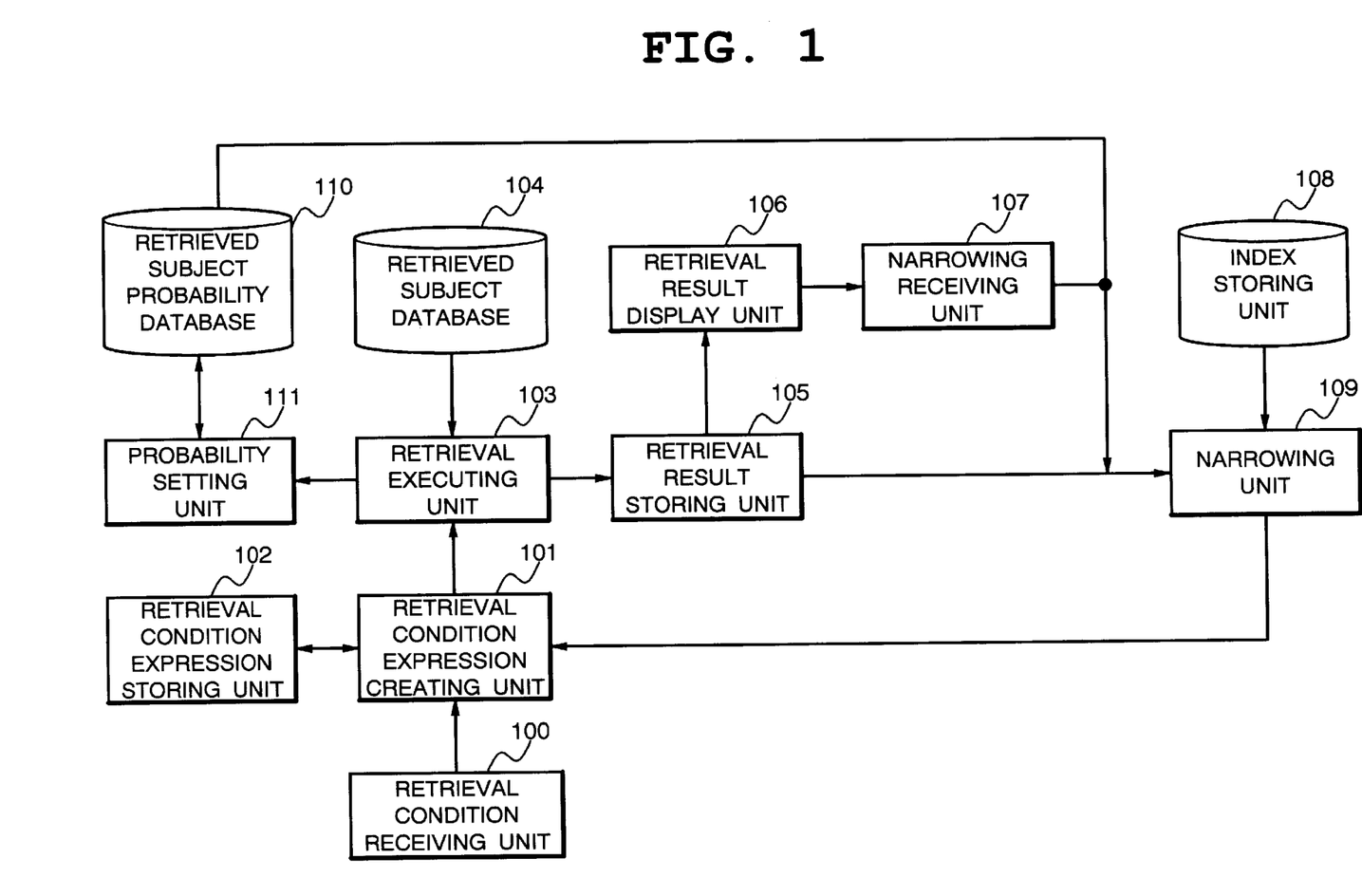
FIG. 1 is a block diagram showing the structure of an information retrieval system according to an embodiment of the present invention.

FIG. 1 is a block diagram showing the structure of an information retrieval system according to an embodiment of the present invention. With reference to FIG. 1, the information retrieval system of the embodiment comprises a retrieved subject database 104 with data of a subject to be retrieved stored therein, a retrieval condition receiving unit 100 for receiving a user's input of a retrieval condition, a retrieval condition expression creating unit 101 for creating an expression of a retrieval condition based on the retrieval condition entered by the retrieval condition receiving unit 100, a retrieval condition expression storing unit 102 for storing the retrieval condition expression created by the retrieval condition expression creating unit 101, a retrieval executing unit 103 for retrieving data through access to the retrieved subject database 104 based on the retrieval condition expression created by the retrieval condition expression creating unit 101, a retrieval result storing unit 105 for storing retrieval results obtained by the retrieval executing unit 103, and a retrieval result display unit 106 for displaying a retrieval result stored in the retrieval result storing unit 105, and further comprises an index storing unit 108 with a hierarchical index to a retrieved subject stored therein, a retrieval probability setting unit 111 and a retrieved subject retrieval probability database 110 for storing the record of retrieval times of each retrieved subject data, and a narrowing receiving unit 107 and a narrowing unit 109 for narrowing down a retrieval result. FIG. 1 shows only the characteristic components in the form of the embodiment, and the description of the other general components is omitted.

The information retrieval system of the embodiment may be realized by a CPU controlled by a program in a computer system such as a work station, a personal computer, or the like, an internal memory such as a RAM or the like, and a storage such as a magnetic disk or the like. A computer program for performing information retrieval processing while controlling the CPU is provided stored in a general storing medium such as a magnetic disk, optical disk, an internal memory, or the like, and it is loaded into an internal memory of a computer system so to control the CPU, thereby realizing the function of each component.

Figure 3:
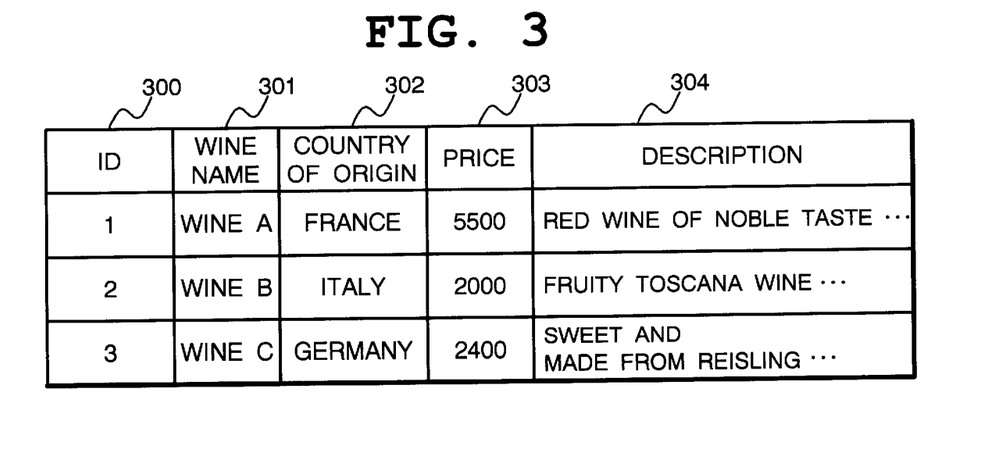
FIG. 3 is a view showing an example of the structure of a retrieved subject database according to the form of the embodiment.

In the above structure, the retrieved subject database 104 sores the data of a subject to be retrieved. FIG. 3 shows an example of the data stored in the retrieved subject database 104. In the retrieved subject database 104 shown in FIG. 3, the data of wine, by way of example, is stored in the relative database, and each data of "ID" field 300, "wine name" field 301, "country of origin" field 302, "price" field 303, and "description" field 304 is stored in the table "wine".

The retrieval condition receiving unit 100 receives a user's input of a retrieval condition. As an input method of a retrieval condition, various conventional methods can be adopted, and a method of combining key words, for example, like "France OR red" in the logical expression can be adopted.

The retrieval condition expression creating unit 101 combines the retrieval condition entered from the retrieval condition receiving unit 100 with the retrieval condition expression stored in the retrieval condition expression storing unit 102 by use of the logical OR or AND, hence to convert the retrieval condition into an expression processable by the retrieval executing unit 103. For example, if the retrieved subject database 104 stores data in the form of a relative database, the retrieval condition expression is provided by the expression of SQL (Structured Query Language) that is the standard query language of the relative database. Assume that the retrieval condition expression stored in the retrieval condition expression storing unit 102 is SELECT*FROM wine WHERE country of origin= "France". The SQL expression thereof is a retrieval condition expression for retrieving the data that the "country of origin" filed is France from the table "wine". When the retrieval condition entered by the retrieval condition receiving unit 100 is a key word "red" and it is ANDed, the retrieval condition expression creating unit 101 creates the retrieval condition expression such as SELECT*FROM wine WHERE country of origin="France" AND color= "red". This expression is a retrieval condition expression for retrieving such data that the "country of origin" field is France and the "color" field is red from the table "wine". Although an example of creating a retrieval condition expression using AND is shown here, it is needless to say that a retrieval condition expression can be created also by use of OR.

The retrieval condition expression creating unit 101, when receiving a partial retrieval condition expression from the narrowing unit 109 as described later, combines the partial retrieval condition expression created by the narrowing unit 109 with the retrieval condition expression stored in the retrieval condition expression storing unit 102 by use of the logical OR or AND, hence to convert the retrieval condition into a retrieval condition expression processable by the retrieval executing unit 103.

The retrieval condition expression storing unit 102 stores the retrieval condition expression created by the retrieval condition expression creating unit 101. The retrieval condition expression stored in the retrieval condition expression storing unit 102 is called by the retrieval condition expression creating unit 101 as mentioned above, depending on the necessity, and it is combined with the retrieval condition entered by a user or the partial retrieval condition expression received by the narrowing unit 109, so to be used to create a new retrieval condition expression.

The retrieval executing unit 103 retrieves data from the retrieved subject database 104 based on the retrieval condition expression created by the retrieval condition expression creating unit 101. For example, if the retrieved subject database 104 is stored in the form of a relative database, the retrieval condition expression is issued to the relative database control system, thereby to perform the retrieval processing.

The retrieval result storing unit 105 stores the retrieval result obtained through the retrieval processing by the retrieval executing unit 103.

Figure 6:
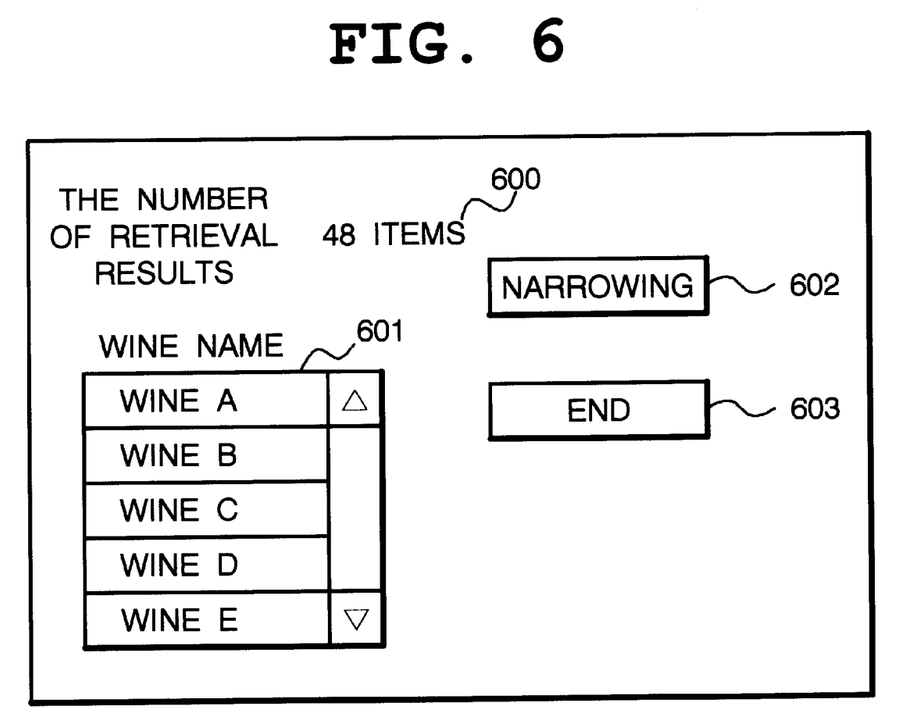
FIG. 6 is a view showing an example of the structure of a display screen of the retrieval results displayed by a retrieval result display unit according to the form of the embodiment.

The retrieval result display unit 106 displays the retrieval result stored in the retrieval result storing unit 105. FIG. 6 shows a display example of the retrieval result obtained by retrieving the data of wine from the retrieved subject database 104 (refer to FIG. 3). FIG. 6 shows an example of displaying the retrieval result on a screen of a display using a graphical user interface of a computer system, and the item 600 indicates the number of the retrieved items of wine and the item 601 indicates a list of names of retrieved wines.

Figure 4:
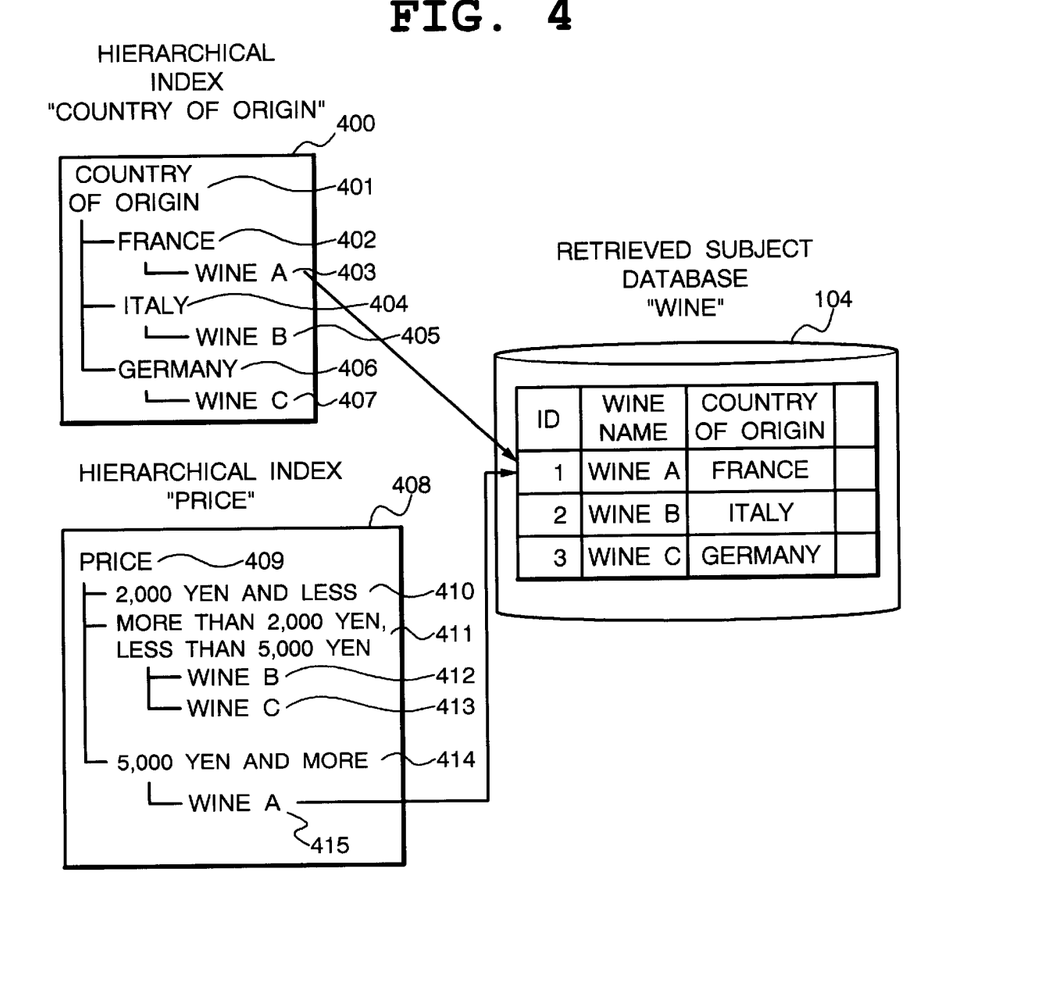
FIG. 4 is a view showing an example of the structure of a hierarchical index according to the form of the embodiment.
Figure 5:
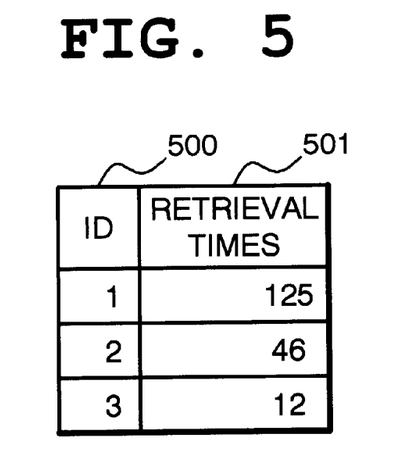
FIG. 5 is a view showing an example of the structure of a database for the retrieval probability of a subject to be retrieved according to the form of the embodiment.

The index storing unit 108 stores the hierarchical index as for the data stored in the retrieved subject database 104. The index to be stored in the index storing unit 108 consists of nodes and leaves. A node can contain a plurality of nodes or leaves at the lower hierarchy and a leaf cannot contain no node nor leaf at the lower hierarchy. FIG. 4 shows an example of the hierarchical index as for the wine data stored in the retrieved subject database 104 (refer to FIG. 3). With reference to FIG. 4, in the hierarchical index "country of origin" 400 classifying the wine data hierarchically from the viewpoint of the "country of origin", the "country of origin" 401 is a node and it contains the other nodes and leaves at the lower hierarchy as illustrated. The "wine A" 403 is a leaf and it contains no node nor leaf at the lower hierarchy. As illustrated, the leaf "wine A" 403 can become an index to the data "wine A" in the retrieved subject database 104.

Generally there are a plurality of viewpoints for classifying the retrieved subject data. For example, "price" and "color" may be considered in the case of wine data. Then, a plurality of hierarchical indexes can be prepared for various viewpoints. The hierarchical index "price" 408 of FIG. 4 is an index with wine data hierarchically classified by the price. Similarly to the leaf "wine A" 403 of the hierarchical index "country of origin" 400, the leaf "wine A" 415 of the hierarchical index "price" 408 can become an index to the data "wine A" in the retrieved subject database 104.

The retrieval subject retrieval probability database 110 stores the retrieval probability of the retrieved subject data stored in the retrieved subject database 104. For example, in the case of the retrieved subject retrieval probability database 110 corresponding to the retrieved subject database 104 shown in FIG. 3, the ID of the wine to be retrieved is stored in the field "ID" 500 of the retrieved subject retrieval probability database, and the number of times of retrieving the data of the wine having the corresponding ID is stored in the field "retrieval times" 501.

The retrieval probability setting unit 111 adds one to the retrieval times of the retrieved subject data having been retrieved in the retrieved subject retrieval probability database 110, and updates the content of the retrieved subject retrieval probability database 110, according to the retrieval result obtained by the retrieval executing unit 103.

The narrowing receiving unit 107 receives a user's input for narrowing a search after the retrieval result is displayed on the retrieval result display unit 106. For example, when the retrieval result is displayed as shown in FIG. 6, and a user selects the "narrowing" button 602 for narrowing a search, the narrowing receiving unit 107 instructs the narrowing unit 109 to start the narrowing processing.

Upon receipt of the instruction from the narrowing receiving unit 107, the narrowing unit 109 acquires the index corresponding to the retrieval result obtained by the retrieval result storing unit 105, out of the index storing unit 108, in a form of question nodes and answer nodes described later, and after performing a predetermined operation, it presents the same to a user. Based on the answer selected by a user, a partial retrieval condition expression for retrieving only the hierarchy under the selected answer node in the index under consideration is created and sent to the retrieval condition expression creating unit 101.

Here, the question node is a node positioned at the lowest hierarchy of the common nodes in all the paths, assuming a path starting from a leaf having an index to the retrieved subject data obtained as the retrieval result and tracing up a node of the hierarchical index to the upper hierarchy. The answer node is a node positioned at a lower hierarchy just beneath the question node.

The narrowing unit 109 computes the expected value of the acquired information of the obtained question node (hereinafter, referred to as expected obtained information amount), according to the retrieval probability stored in the retrieved subject retrieval probability database 110, as the operation in the case of presenting a question node and an answer node. Each question node and answer node is presented in order of decreasing the expected acquired information amount. The question nodes and answer nodes are displayed, for example, on a screen of a display of a computer system, with the content of each question node described there and with the button indicating the content of each answer node displayed thereon. A user can specify a button indicating the content of an answer node, thereby to select his or her desired answer node.

Figure 2:
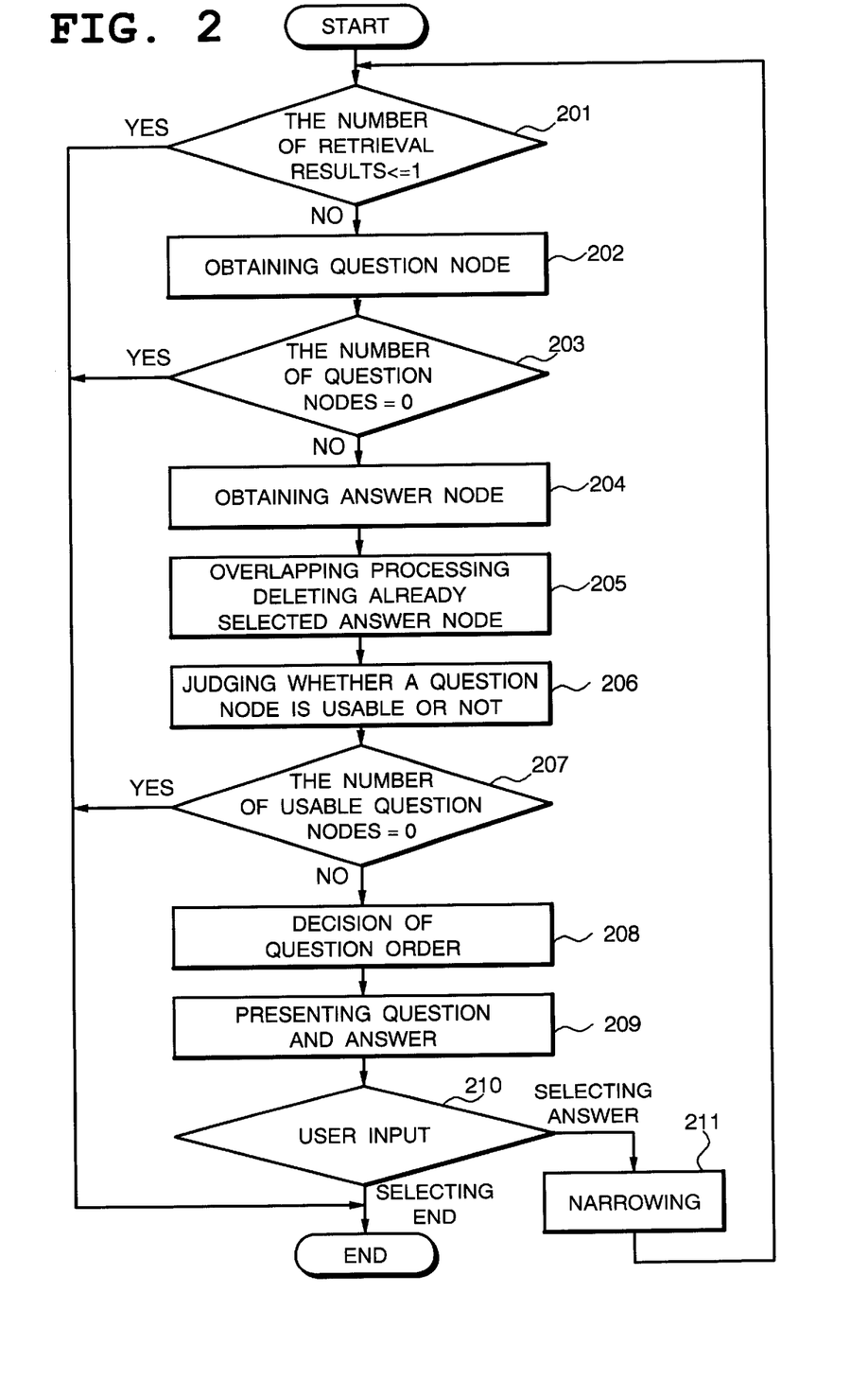
FIG. 2 is a flow chart showing the operation of a narrowing unit according to the form of the embodiment.

The operation of the narrowing unit 109 will be described concretely with reference to the flow chart of FIG. 2 and FIG. 7.

Figure 7:
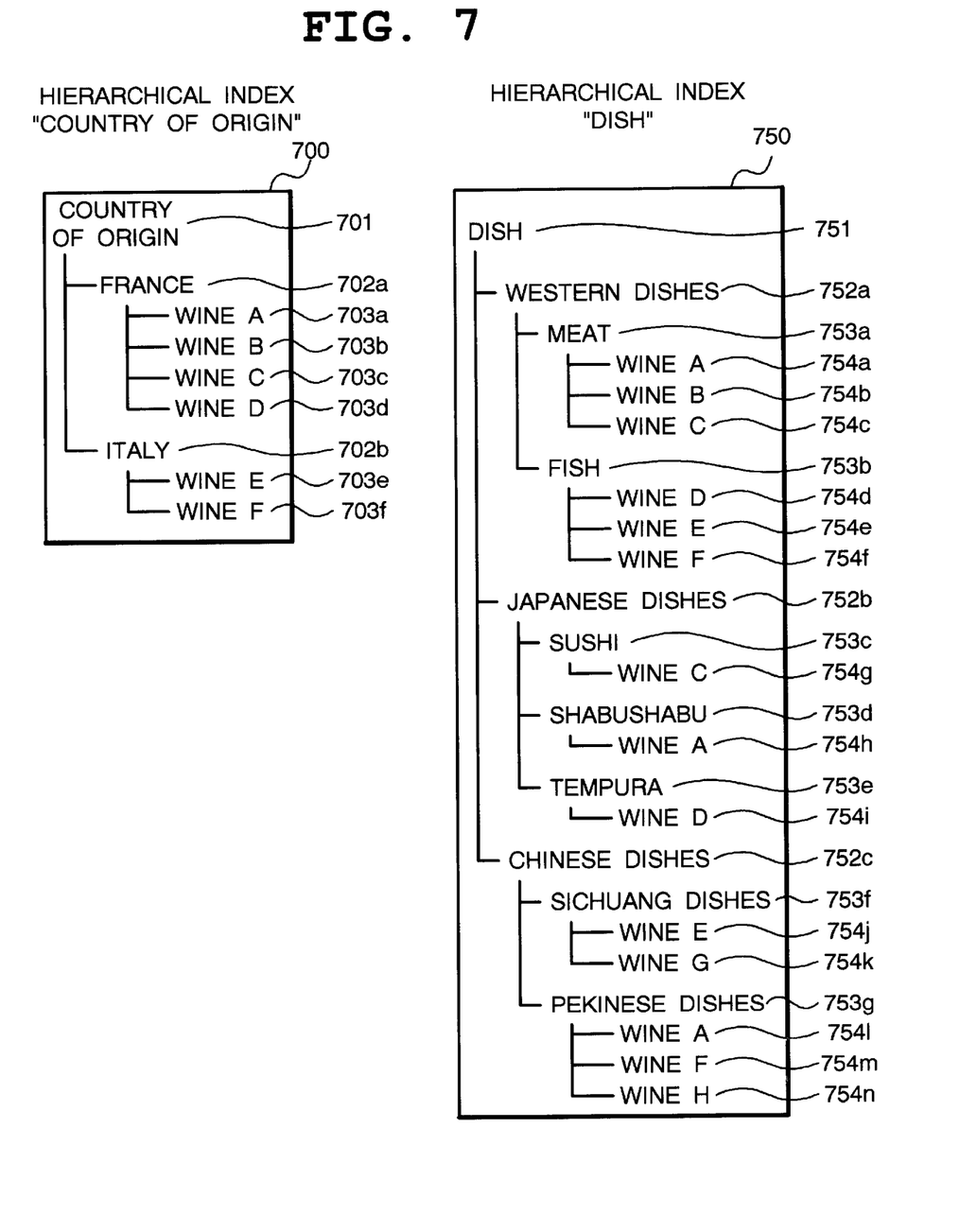
FIG. 7 is a view for use in describing narrowing processing according to the form of the embodiment, showing an example of a hierarchical index for use in the processing.

FIG. 7 shows the hierarchical index "country of origin" 700 and the hierarchical index "dish" 750, created as for the wine data stored in the retrieved subject database 104 (refer to FIG. 3). As illustrated, the hierarchical index "country of origin" 700 contains a leaf 703*a*, a leaf 703*b*, . . . , and a leaf 703*f*. The hierarchical index "dish" 750 contains a leaf 754*a*, a leaf 754*b*, . . . , and a leaf 754*n*. The leaf 754*a*, leaf 754*h*, and leaf 754*l* are indexed by the same retrieved subject data "wine A", the leaf 754*c* and leaf 754*g* are indexed to the same retrieved subject data "wine C", the leaf 754*d* and 754*i* are indexed to the same retrieved subject data "wine D", the leaf 754*e* and 754*j* are indexed to the same retrieved subject data "wine E", and the leaf 754*f* and leaf 754*m* are indexed to the same retrieved subject data "wine F".

When obtaining four items of retrieved subject data as a retrieval result; "wine A", "wine B", "wine D", and "wine E", the leaf indexed to these retrieved subject data may be the leaf 754*a*, 754*b*, 754*d*, 754*e*, 754*h*, 754*i*, 754*j*, and 754*l*, in the hierarchical index "dish" 750. In this case, the question node is "dish" 751 and the answer nodes are "Western dishes" 752*a*, "Japanese dishes" 752*b*, and "Chinese dishes" 752*c* positioned at a lower hierarchy just below the question node. In another condition, when the retrieval result is two; "wine G" and "wine H", the question node is "Chinese dishes" 752*c* and the answer nodes are "Sichuang dishes" 753*f* and "Pekinese dishes" 753*g* positioned at a lower hierarchy just below the question node.

The operation of the narrowing unit 109 will be described with reference to the flow chart of FIG. 2, for example, in the case of initially performing a search with a key word, so to find six items of wine data "wine A", "wine B", "wine C", "wine D", "wine E" and "wine F".

If the number of data in the retrieval result obtained by the retrieval result storing unit 105 is one and less, the narrowing processing will be finished (Step 201). When the number of data in the retrieval result is two and more, a question node is obtained from the index storing unit 108 (Step 202). Referring to the example of FIG. 7, in the case of the hierarchical index "country of origin" 700, the question node is "country of origin" 701. The question node of the hierarchical index "dish" 750 is "dish" 751. If the number of the obtained question nodes is zero, the narrowing processing will be finished (Step 203).

This time, the answer nodes as for each question node obtained in Step 202 are obtained (Step 204). According to the example of FIG. 7, the answer nodes of the question node "country of origin" 701 are "France" 702*a* and "Italy" 702*b*. The answer nodes of the question node "dish" 751 are "Western dishes" 751*a*, "Japanese dishes" 751*b*, and "Chinese dishes" 751*c*.

When overlapped indexes are found in the answer nodes as for each question node obtained in Step 204, the answer node having been selected already is deleted (Step 205). In other words, the retrieval result is divided by the answer nodes that are answer alternatives as for a question node in the operation up to Step 204, when a leaf indexed to the same data also exists at a lower hierarchy below another answer node as for the sama question node, if the answer nodes contain the node having been selected already, the corresponding answer node is deleted. As a result, when the number of the answer nodes becomes zero, the question node is deleted, the question node is replaced by the answer node, and an answer node as for the new question node is searched for. This processing will be repeated until a question node can be extracted.

In the case of the example of FIG. 7, the answer node "France" 702*a*, as for the question node "country of origin" 701, contains the leaf "wine A", "wine B", "wine C", and "wine D", and the answer node "Italy" 702*b* contains the leaf "wine E" and "wine E". In this case, there is no overlap.

On the other hand, as for the question node "dish" 751, the answer node "Western dishes" 752*a* contains the leaf "wine A", "wine B", "wine C", "wine D", "wine E", and "wine F", the answer node "Japanese dishes" 752*b* contains the leaf "wine A", "wine C", and "wine D", and the answer node "Chinese dishes" 752*c* contains the leaf "wine A", "wine E", and "wine F". In this case, the leaf "wine A" extends over each lower hierarchy under the answer nodes "Western dishes" 752*a*, "Japanese dishes" 752*b*, and "Chinese dishes" 752*c*. The leaf "wine C", "wine D", "wine E", and "wine F" extends over each lower hierarchy under the two answer nodes. Therefore, these answer nodes are properly deleted. More specifically, when the answer node "Western dishes" 752*a* has been already selected, the answer nodes "Japanese dishes" 752*b* and "Chinese dishes" 752*c* are deleted. When the selected answer nodes are "Western dishes" 752*a*, "Japanese dishes" 752*b*, and "Chinese dishes" 752*c*, the question node "dish" 751 is deleted, and the question node is replaced by the answer nodes "Western dishes" 752*a*, "Japanese dishes" 752*b*, and "Chinese dishes" 752*c* as new question nodes, so to search for each answer node. Answer nodes as for the new question node "Western dishes" 752*a* are "meat" 753*a* and "fish" 753*b*. Answer nodes as for the new question node "Japanese dishes" 752*b* are "Sushi" 753*c*, "Shabushabu" 753*d*, and "Tempura" 753*e*. Answer nodes as for the new question node "Chinese dishes" 752*c* are "Sichuang dishes" 753*f* and "Pekinese dishes" 753*g*. This can escape overlap. The description will be, hereinafter, made assuming that the answer node "Western dishes" 752*a* is selected.

This time, whether a question node is usable or not is judged (Step 206). When the leaves indexed to the retrieval results obtained by the question node obtained in Step 205 all exist at the same hierarchy and the hierarchy of the question node belongs to the same hierarchy or the hierarchy right above the corresponding leaves, the corresponding question node is judged to be non-usable.

In the example of FIG. 7, the leaves indexed to the retrieval results obtained by the question node "country of origin" 701 are "wine A" 703*a*, "wine B" 703*b*, "wine C" 703*c*, "wine D" 703*d*, "wine E" 703*e*, and "wine F" 703*f*. These leaves all belong to the same hierarchy, and the question node "country of origin" 701 is not at the same hierarchy nor at the hierarchy right above the leaves, and therefore the question node is usable. The leaves indexed to the retrieval results obtained by the question node "Japanese dishes" 752*b* are "wine A" 754*h*, "wine C" 754*g*, and "wine D" 754*i*. These leaves are all at the same hierarchy and the question node "Japanese dishes" 752*b* is not at the same hierarchy nor at the hierarchy right above the leaves, and therefore it is usable. Further, the leaves indexed to the retrieval results obtained by the question node "Chinese dishes" 752*c* are "wine A" 754*l*, "wine E" 754*j*, and "wine F" 754*m*. These leaves are all at the same hierarchy and the question node "Chinese dishes" 752*c* is not at the same hierarchy nor at the hierarchy right above the leaves, and therefore it is usable.

In these ways, when the number of the question nodes judged to be usable becomes zero as a result of judging whether each question node is usable or not, the narrowing processing will be finished (Step 207).

This time, the expected acquired information amount (described later) obtained by asking each question as for the respective question nodes is computed, and the question nodes are sorted in decreasing order of the expected acquired information amount (Step 208). In FIG. 7, assume that the expected acquired information amount is decreased in order of the question node "Japanese dishes" 752*b*, the question node "Chinese dishes" 752*c*, and the question node "country of origin" 701.

Figure 8:
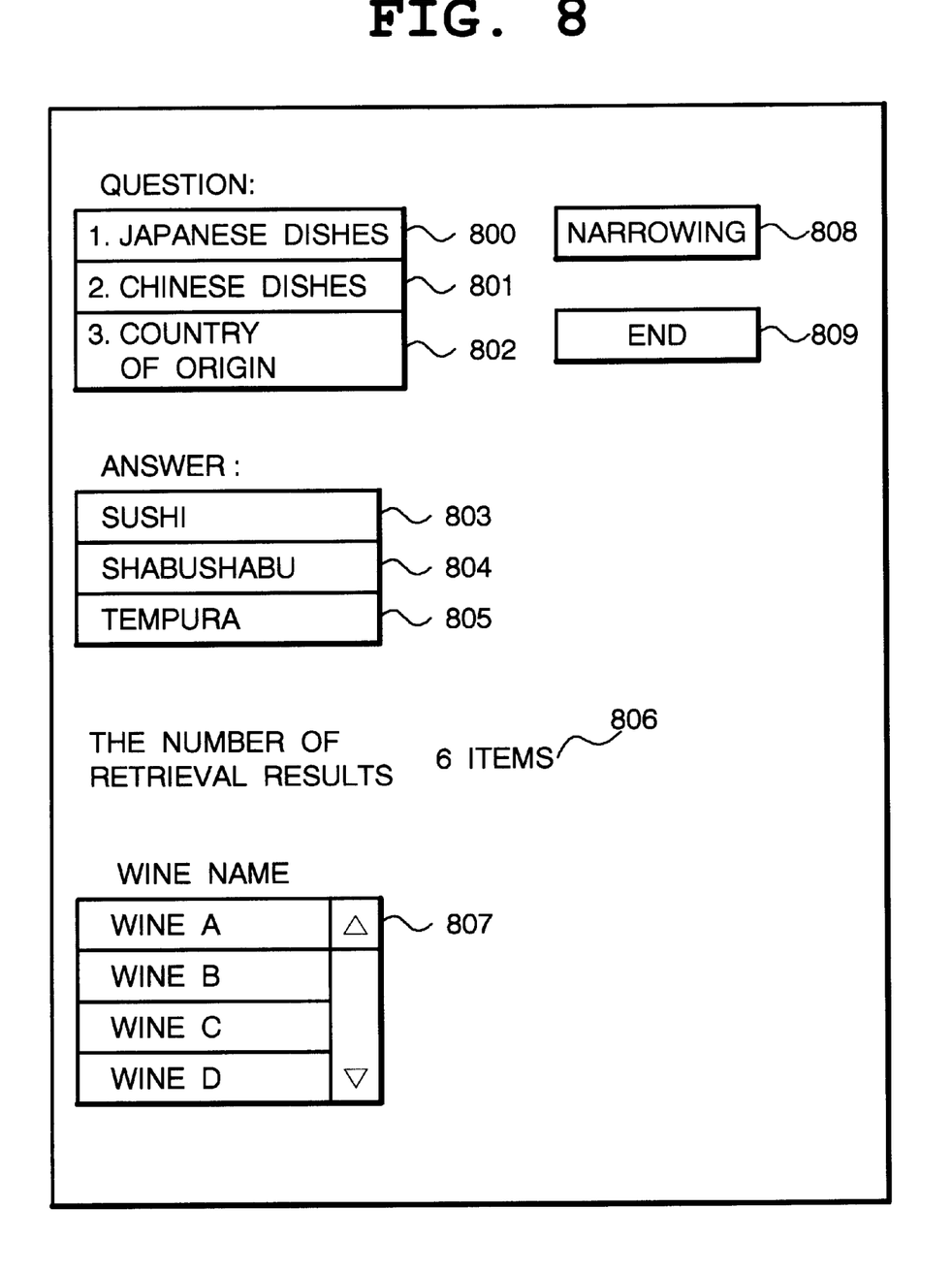
FIG. 8 is a view for use in describing narrowing processing according to the form of the embodiment, showing an example of a display screen for presenting questions and answers obtained from a hierarchical index.

According to the order decided in Step 208, each question node and answer node is presented to a user (Step 209). FIG. 8 shows an example of questions and answers obtained through the hierarchical index that are displayed on a display screen of a display by using a graphical user interface of a computer. With reference to FIG. 8, the question "1. Japanese dishes" 800, "2. Chinese dishes" 801, and "3. Country of origin" 802 are displayed and as the answer alternatives as for the selected question "1. Japanese dishes" 800, the answer "Sushi" 803, "Shabushabu" 804, and "Tempura" 805 are displayed. This indicates to a user that he or she wants some wine to match with Sushi, Shabushabu, or Tempura, of the wine to match with Japanese dishes. The item 806 is the number of retrieved wines and the item 807 is a list of names of the retrieved wines.

Upon receipt of a user's input through the display screen of FIG. 8, when a user selects end, the narrowing processing will be finished (Step 210). When he or she selects an answer node, the narrowing processing will be performed (Step 211). In the example of FIG. 8, when selecting an end button 809, the processing will be finished, and when selecting one of the answer "Sushi" 803, "Shabushabu" 804, and "Tempura" 805 and putting on a narrowing button 808, the narrowing processing will be performed.

When selecting the narrowing, a retrieval result established as for a leaf obtained by the selected answer node is replaced as a new retrieval condition and the step will return to Step 201 (Step 211). In the example of FIG. 8, if selecting the answer "Sushi" 803, the search is narrowed down to one retrieved subject data indexed by the leaf "wine C" 754*g* at a lower hierarchy below the answer node "Sushi" 753*c* of FIG. 7.

The method of deciding the order of questions in Step 208 will be described in details. The method of deciding the order of questions according to the form of the embodiment is based on the entropy maximization principle of expected acquired information that is used in the ID3. The ID3 is described in, for example, "Induction of Decision Trees" (Machine Learning, Vol. 1, pp. 81–pp. 106, 1986) written by J. R. Quinlan.

Assuming that the collection of the retrieval results stored in the retrieval result storing unit 105 is defined as C, the number of retrieval result data to be retrieved is defined as m, the retrieval result data to be retrieved is r1, r2, ..., rm, the number of retrieval times of the retrieved subject data rj is defined as hj, and that the times of retrieval results appearing at a lower hierarchy below various answer nodes is defined as vj ($1 \leq j \leq m$), with reference to the retrieved subject retrieval probability database 110, the retrieval probability pj of the retrieved subject data rj is computed by the following expression.

$$p^j = \frac{h_j}{v_j \sum_{i=1}^{m} h_j}$$

The information amount (entropy) M(C) of the collection C of the retrieval results can be expressed as the following expression.

$$M(C) = -\sum_{j=1}^{m} p^j \log_2 p^j$$

The expected information amount B (C, a) when the retrieval result collection C is divided into partial collections C1, ..., Cn based on the answer nodes a1, ..., an as for a question node a can be expressed as the following expression.

$$B(C, a) = \sum_{i=1}^{n} \frac{|C_i|}{|C|} M(C_i)$$

The expected value gain (C, a) of the acquired information can be obtained by the following expression.

$$\mathrm{gain}(C,a) = M(C) - B(C,a)$$

By dividing the retrieval result collection C using the question a that maximizes thus obtained gain (C, a), it is possible to narrow down the retrieval result collection efficiently.

In the example of FIG. 7, assume that the number of the retrieval times for computing the retrieval probability is respectively established in the retrieved subject retrieval probability database 110, as wine A=200, wine B=100, wine C=10, wine D=2, wine E=2, and wine F=4. By use of these probabilities, the information amount M (C) of the retrieval result collection is computed as the follows.

$$M(C) = -\frac{200}{318}\log_2\frac{200}{318} - \frac{100}{318}\log_2\frac{100}{318} - \frac{10}{318}\log_2\frac{10}{318} -$$
$$\frac{2}{318}\log_2\frac{2}{318} - \frac{2}{318}\log_2\frac{2}{318} - \frac{4}{318}\log_2\frac{4}{318}$$
$$= 1.274$$

Next, the expected information amount B (C, country of origin) of the question node "country of origin" 701 is computed. The question node "country of origin" 701 contains "France" 702a and "Italy" 702b as the answer node. Therefore, the attribute value is two, the number of the retrieval results obtained by the answer node "France" 702a is four, and the number of the retrieval results obtained by the answer node "Italy" 702b is two. According to the above condition, the expected information amount B (C, country of origin) is computed as follows.

$$B(C, \text{COUNTRY OF ORIGIN}) = \frac{312}{318}\left(-\frac{200}{312}\log_2\frac{200}{312} - \right.$$
$$\frac{100}{312}\log_2\frac{100}{312} - \frac{10}{312}\log_2\frac{10}{312} -$$
$$\left.\frac{2}{312}\log_2\frac{2}{312}\right) + \frac{6}{318}\left(-\frac{2}{6}\log_2\frac{2}{6} - \right.$$
$$\left.\frac{4}{6}\log_2\frac{4}{6}\right)$$
$$= 1.139$$

Similarly, the expected amount B (C, Japanese dishes) and the expected amount B (C, Chinese dishes) of the question node "Japanese dishes" 752b and the question node "Chinese dishes" 752c are computed as follows.

$$B(C, \text{JAPANESE DISHES}) = \frac{10}{318}\left(-\frac{10}{10}\log_2\frac{10}{10}\right) +$$
$$\frac{200}{318}\left(-\frac{200}{200}\log_2\frac{200}{200}\right) +$$
$$\frac{2}{318}\left(-\frac{2}{2}\log_2\frac{2}{2}\right) +$$
$$\frac{106}{318}\left(-\frac{100}{106}\log_2\frac{100}{106} - \right.$$
$$\left.\frac{2}{106}\log_2\frac{2}{106} - \frac{4}{106}\log_2\frac{4}{106}\right)$$
$$= 0.122$$

$$B(C, \text{CHINESE DISHES}) = \frac{2}{318}\left(-\frac{2}{2}\log_2\frac{2}{2}\right) +$$
$$\frac{204}{318}\left(-\frac{200}{204}\log_2\frac{200}{204} - \frac{4}{204}\log_2\frac{4}{204}\right) +$$
$$\frac{112}{318}\left(-\frac{100}{112}\log_2\frac{100}{112} - \frac{10}{112}\log_2\frac{10}{112} - \right.$$
$$\left.\frac{2}{112}\log_2\frac{2}{112}\right)$$
$$= 0.287$$

This time, the gain (C, country of origin) of the question node "country of origin" 701, the gain (C, Japanese dishes) of the question node "Japanese dishes" 752b, and the gain (C, Chinese dishes) of the question node "Chinese dishes" 752c are computed as follows.

gain(C,COUNTRY OF ORIGIN)=M(C)-B(C,COUNTRY OF ORIGIN)=0.135 gain(C,JAPANESE DISHES)=M(C)-B(C,JAPANESE DISHES)= 1.152 gain(C,CHINESE DISHES)=M(C)-B(C,CHINESE DISHES)= 0.987

As mentioned above, the order of questions presented to a user becomes decreasing order of gain; the question node "Japanese dishes" 752b, the question node "Chinese dishes" 752c, and the question node "country of origin" 701.

As set forth hereinabove, according to the information retrieval system and its method of the present invention and according to a storing medium storing the information retrieval program of the present invention, nodes of hierarchical index established as for the data of a retrieved subject are presented to a user in the most effective order for narrowing, and therefore a user can select a proper retrieval condition easily according to the information that is presented, thereby narrowing down a retrieval result efficiently.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An information retrieval system for retrieving desired data from a retrieved subject database with data to be retrieved stored therein, comprising:

retrieval condition expression creating means for creating a retrieval condition expression by use of an entered retrieval condition;

retrieval executing means for executing retrieval processing through access to the retrieved subject database based on a retrieval condition expression created by said retrieval condition expression creating means;

index storing means for storing each hierarchical index as for retrieved subject data stored in the retrieved subject database;

retrieved subject retrieval probability storing means for storing record of retrieval times of each retrieved subject data stored in the retrieved subject database; and narrowing means of obtaining the index corresponding to the retrieved subject data obtained by said retrieval executing means as a retrieval result, from said index storing means, computing expected value of acquired information based on the retrieval times of the retrieval result data stored in said retrieved subject retrieval probability storing means, and presenting to a user the index information corresponding to the retrieval results, in decreasing order of the expected value of the computed acquired information as for the retrieved subject data that is the retrieval result, for narrowing down a retrieval result obtained by said retrieval executing means, in reply to a user's narrowing request.

2. An information retrieval system as set forth in claim 1, further comprising:
retrieval condition receiving means for receiving a user's input of a retrieval condition; and
retrieval result display means for displaying a retrieval result obtained from the retrieval processing by said retrieval executing means.

3. An information retrieval system as set forth in claim 1, in which
said narrowing means
obtains, from the hierarchical index stored in said index storing means, a question node that is a node positioned at the lowest hierarchy, of the common nodes in all the paths, and an answer node that is a node positioned at a lower hierarchy right beneath the question node, assuming a path starting from a leaf indexed to the retrieved subject data obtained by said retrieval executing means as a retrieval result and tracing the nodes of hierarchical index up to the upper hierarchy,
computes the expected value of the acquired information as for the respective obtained question nodes, and
presents to a user the question nodes in decreasing order of the expected value of the computed acquired information and the answer nodes corresponding to the respective question nodes.

4. An information retrieval system as set forth in claim 1, in which
said narrowing means
obtains, from the hierarchical index stored in said index storing means, a question node that is a node positioned at the lowest hierarchy, of the common nodes in all the paths, and an answer node that is a node positioned at a lower hierarchy right beneath the question node, assuming a path starting from a leaf indexed to the retrieved subject data obtained by said retrieval executing means as a retrieval result and tracing the nodes of hierarchical index up to the upper hierarchy,
computes the expected value of the acquired information as for the respective obtained question nodes, and
presents to a user the question nodes in decreasing order of the expected value of the computed acquired information and the answer nodes corresponding to the respective question nodes, and further
said narrowing means
computes information amount M(C) of collection C of the retrieved subject data by the following expression, assuming that the collection of the retrieved subject data that is a retrieval result by said retrieval executing means is defined as C, by use of the number k of the retrieved subject data that is the retrieval result and the existence ratio Pj of the retrieved subject data j of the collection C of the retrieved subject data, $$M(C) = -\sum_{j=1}^{k} P^j \log_2 P^j$$

computes the expected information amount B (C, a) when the collection C is divided into partial collections C1, ..., Cn based on the answer nodes a1, ..., an as for the given question node a, by the following expression, $$B(C, a) = \sum_{i=1}^{n} \frac{|C_i|}{|C|} M(C_i)$$

and computes the expected value gain (C, a) of the acquired information of the respective question nodes, by the following expression, $$\mathrm{gain}(C,a) = M(C) - B(C,a).$$

5. An information retrieval system as set forth in claim 4, in which
said narrowing means
makes the existence ratio Pj of the retrieved subject data j in the collection C, as the retrieval probability pj of the retrieved subject data rj that is computed by the following expression, by use of the number k of the retrieved subject data that is a retrieval result by said retrieval executing means, the retrieved subject data r1, r2, ..., rm that is the retrieval result, the retrieval times hj of the given retrieved subject data rj ($1 \leq j \leq m$), and the number of times vj the retrieval result appears at a lower hierarchy below a different answer node, $$p^j = \frac{h_j}{v_j \sum_{i=1}^{k} h_j}.$$

6. An information retrieval system as set forth in claim 1, in which
said narrowing means
obtains, from the hierarchical index stored in said index storing means, a question node that is a node positioned at the lowest hierarchy, of the common nodes in all the paths, and an answer node that is a node positioned at a lower hierarchy right beneath the question node, assuming a path starting from a leaf indexed to the retrieved subject data obtained by said retrieval executing means as a retrieval result and tracing the nodes of hierarchical index up to the upper hierarchy,
computes the expected value of the acquired information as for the respective obtained question nodes,
presents to a user the question nodes in decreasing order of the expected value of the computed acquired information and the answer nodes corresponding to the respective question nodes, and
according to a narrowing instruction entered by a user, creates a partial retrieval condition for retrieving only the lower hierarchy below the answer node selected by the narrowing instruction, in the hierarchical index, so to hand the same condition to said retrieval condition expression creating means, while
said retrieval condition expression creating means
converts the retrieval condition into an expression processable by said retrieval executing means by use of the partial retrieval condition expression when receiving the partial retrieval condition expression from said narrowing means, in addition to creation of a retrieval condition expression based on the retrieval condition entered by said retrieval condition receiving means.

7. An information retrieval system as set forth in claim 4, in which said narrowing means, according to a narrowing instruction entered by a user, creates a partial retrieval condition for retrieving only the lower hierarchy below the answer node selected by the narrowing instruction, in the hierarchical index, so to hand the same condition to said retrieval condition expression creating means, while said retrieval condition expression creating means converts the retrieval condition into an expression processable by said retrieval executing means by use of the partial retrieval condition expression when receiving the partial retrieval condition expression from said narrowing means, in addition to creation of a retrieval condition expression based on the retrieval condition entered by said retrieval condition receiving means.

8. An information retrieval system as set forth in claim 4, in which said narrowing means makes the existence ratio Pj of the retrieved subject data j in the collection C as the retrieval probability pj of the retrieved subject data rj that is computed by the following expression, by use of the number k of the retrieved subject data that is a retrieval result by said retrieval executing means, the retrieved subject data r1, r2, . . . , rm that is the retrieval result, the retrieval times hj of the given retrieved subject data rj ($1 \leq j \leq m$), and the number of times vj the retrieval result appears at a lower hierarchy below a different answer node, $$p^j = \frac{h_j}{v_j \sum_{i=1}^{k} h_j}$$

and, according to a narrowing instruction entered by a user, creates a partial retrieval condition for retrieving only the lower hierarchy below the answer node selected by the narrowing instruction, in the hierarchical index, so to hand the same condition to said retrieval condition expression creating means, while said retrieval condition expression creating means converts the retrieval condition into an expression processable by said retrieval executing means by use of the partial retrieval condition expression when receiving the partial retrieval condition expression from said narrowing means, in addition to creation of a retrieval condition expression based on the retrieval condition entered by said retrieval condition receiving means.

9. An information retrieval method for retrieving desired data from a retrieved subject database with data to be retrieved stored therein, comprising the following steps of:

performing retrieval processing in an arbitrary retrieval method;

obtaining the index information corresponding to the retrieved subject data obtained as a retrieval result, from the hierarchical indexes as for the retrieved subject data stored in said retrieved subject database;

obtaining the number of retrieval times of the retrieved subject data obtained as the retrieval result, of the record of the retrieval times of each retrieved subject data stored in said retrieved subject database;

computing expected value of acquired information based on the obtained retrieval times;

presenting to a user the index information corresponding to the retrieval results, in decreasing order of the expected value of the computed acquired information as for the retrieved subject data that is the retrieval result; and narrowing down the retrieval result in reply to a user's narrowing request.

10. An information retrieval method as set forth in claim 9, in which said narrowing step includes a step of obtaining, from the hierarchical index, a question node that is a node positioned at the lowest hierarchy, of the common nodes in all the paths, and an answer node that is a node positioned at a lower hierarchy right beneath the question node, assuming a path starting from a leaf indexed to the retrieved subject data obtained as a retrieval result and tracing the nodes of hierarchical index up to the upper hierarchy, a step of computing the expected value of the acquired information as for the respective obtained question nodes, and a step of presenting to a user the question nodes in decreasing order of the expected value of the computed acquired information and the answer nodes corresponding to the respective question nodes.

11. An information retrieval method as set forth in claim 9, in which said narrowing step includes a step of obtaining, from the hierarchical index, a question node that is a node positioned at the lowest hierarchy, of the common nodes in all the paths, and an answer node that is a node positioned at a lower hierarchy right beneath the question node, assuming a path starting from a leaf indexed to the retrieved subject data obtained as a retrieval result and tracing the nodes of hierarchical index up to the upper hierarchy, a step of computing the expected value of the acquired information as for the respective obtained question nodes, and a step of presenting to a user the question nodes in decreasing order of the expected value of the computed acquired information and the answer nodes corresponding to the respective question nodes, and said step of computing the expected value of the acquired information includes a step of computing information amount M(C) of collection C of the retrieved subject data by the following expression, assuming that the collection of the retrieved subject data that is a retrieval result is defined as C, by use of the number k of the retrieved subject data that is the retrieval result and the existence ratio Pj of the retrieved subject data j of the collection C of the retrieved subject data, $$M(C) = -\sum_{j=1}^{k} P^j \log_2 P^j$$

a step of computing the expected information amount B (C, a) when the collection C is divided into partial collections C1, . . . , Cn based on the answer nodes a1, ..., an as for the given question node a, by the following expression, $$B(C, a) = \sum_{i=1}^{n} \frac{|C_i|}{|C|} M(C_i)$$

and a step of computing the expected value gain (C, a) of the acquired information of the respective question nodes, by the following expressions, $$\text{gain}(C,a) = M(C) - B(C,a).$$

12. An information retrieval method as set forth in claim 11, in which
in said step of computing the information amount M(C) of the collection C of the retrieved subject data,
the existence ratio Pj of the retrieved subject data j in the collection C is made as the retrieval probability pj of the retrieved subject data rj that is computed by the following expression, by use of the number k of the retrieved subject data that is a retrieval result by said retrieval executing means, the retrieved subject data r1, r2, ..., rm that is the retrieval result, the retrieval times hj of the given retrieved subject data rj ($1 \leq j \leq m$), and the number of times vj the retrieval result appears at a lower hierarchy below a different answer node, $$p^j = \frac{h_j}{v_j \sum_{i=1}^{k} h_j}.$$

13. A computer readable memory storing an information retrieval program for retrieving desired data from a retrieved subject database with data to be retrieved stored therein while controlling a computer system, in which
said information retrieval program includes the following steps of:
performing retrieval processing in an arbitrary retrieval method;
obtaining the index information corresponding to the retrieved subject data obtained as a retrieval result, from the hierarchical indexes as for the retrieved subject data stored in said retrieved subject database;
obtaining the number of retrieval times of the retrieved subject data obtained as the retrieval result, of the record of the retrieval times of each retrieved subject data stored in said retrieved subject database;
computing expected value of acquired information based on the obtained retrieval times;
presenting to a user the index information corresponding to the retrieval results, in decreasing order of the expected value of the computed acquired information as for the retrieved subject data that is the retrieval result; and
narrowing down the retrieval result in reply to a user's narrowing request.
14. A computer readable memory storing an information retrieval program as set forth in claim 13, in which
said narrowing step of the information retrieval program includes
a step of obtaining, from the hierarchical index, a question node that is a node positioned at the lowest hierarchy, of the common nodes in all the paths, and an answer node that is a node positioned at a lower hierarchy right beneath the question node, assuming a path starting from a leaf indexed to the retrieved subject data obtained as a retrieval result and tracing the nodes of hierarchical index up to the upper hierarchy,
a step of computing the expected value of the acquired information as for the respective obtained question nodes, and
a step of presenting to a user the question nodes in decreasing order of the expected value of the computed acquired information and the answer nodes corresponding to the respective question nodes.
15. A computer readable memory storing an information retrieval program as set forth in claim 13, in which
said narrowing step in the information retrieval program includes
a step of obtaining, from the hierarchical index, a question node that is a node positioned at the lowest hierarchy, of the common nodes in all the paths, and an answer node that is a node positioned at a lower hierarchy right beneath the question node, assuming a path starting from a leaf indexed to the retrieved subject data obtained as a retrieval result and tracing the nodes of hierarchical index up to the upper hierarchy,
a step of computing the expected value of the acquired information as for the respective obtained question nodes, and
a step of presenting to a user the question nodes in decreasing order of the expected value of the computed acquired information and the answer nodes corresponding to the respective question nodes, and
said step of computing the expected value of the acquired information in the information retrieval program includes
a step of computing information amount M(C) of collection C of the retrieved subject data by the following expression, assuming that the collection of the retrieved subject data that is a retrieval result is defined as C, by use of the number k of the retrieved subject data that is the retrieval result and the existence ratio Pj of the retrieved subject data j of the collection C of the retrieved subject data, $$M(C) = -\sum_{j=1}^{k} P^j \log_2 P^j$$

a step of computing the expected information amount B (C, a) when the collection C is divided into partial collections C1, ..., Cn based on the answer nodes a1, ..., an as for the given question node a, by the following expression, $$B(C, a) = \sum_{i=1}^{n} \frac{|C_i|}{|C|} M(C_i)$$

and a step of computing the expected value gain (C, a) of the acquired information of the respective question nodes, by the following expression, $$\text{gain}(C,a) = M(C) - B(C,a).$$

16. A computer readable memory storing an information retrieval program as set forth in claim 15, in which
in said step of computing the information amount M(C) of the collection C of the retrieved subject data in the information retrieval program, the existence ratio Pj of the retrieved subject data j in the collection C is made as the retrieval probability pj of the retrieved subject data rj that is computed by the following expression, by use of the number k of the retrieved subject data that is a retrieval result by said retrieval executing means, the retrieved subject data r1, r2, . . . , rm that is the retrieval result, the retrieval times hj of the given retrieved subject data rj ($1 \leq j \leq m$), and the number of times vj the retrieval result appears at a lower hierarchy below a different answer node, $$p^j = \frac{h_j}{v_j \sum_{i=1}^{k} h_j}.$$

17. An information retrieval system for retrieving desired data from a retrieved subject database with data to be retrieved stored therein based on a retrieval condition expression, comprising:

retrieved subject retrieval probability storing means for storing record of retrieval times of each retrieved subject data stored in the retrieved subject database; and narrowing means of obtaining the index corresponding to the retrieved subject data obtained as a retrieval result, from said index storing means storing hierarchical indexes as for the retrieved subject data stored in said retrieved subject database, computing expected value of acquired information based on the retrieval times of the retrieval result data stored in said retrieved subject retrieval probability storing means, and presenting to a user the index information corresponding to the retrieval result, in decreasing order of the expected value of the computed acquired information as for the retrieved subject data that is the retrieval result, for narrowing down a retrieval result obtained by said retrieval executing means, in reply to a user's narrowing request.

18. An information retrieval system as set forth in claim 17, in which said narrowing means obtains, from the hierarchical index stored in said index storing means, a question node that is a node positioned at the lowest hierarchy, of the common nodes in all the paths, and an answer node that is a node positioned at a lower hierarchy right beneath the question node, assuming a path starting from a leaf indexed to the retrieved subject data obtained as a retrieval result and tracing the nodes of hierarchical index up to the upper hierarchy, computes the expected value of the acquired information as for the respective obtained question nodes, and presents to a user the question nodes in decreasing order of the expected value of the computed acquired information and the answer nodes corresponding to the respective question nodes.

19. An information retrieval system as set forth in claim 17, in which said narrowing means obtains, from the hierarchical index stored in said index storing means, a question node that is a node positioned at the lowest hierarchy, of the common nodes in all the paths, and an answer node that is a node positioned at a lower hierarchy right beneath the question node, assuming a path starting from a leaf indexed to the retrieved subject data obtained as a retrieval result and tracing the nodes of hierarchical index up to the upper hierarchy, computes the expected value of the acquired information as for the respective obtained question nodes, and presents to a user the question nodes in decreasing order of the expected value of the computed acquired information and the answer nodes corresponding to the respective question nodes, and further said narrowing means computes information amount M(C) of collection C of the retrieved subject data by the following expression, assuming that the collection of the retrieved subject data that is a retrieval result is defined as C, by use of the number k of the retrieved subject data that is the retrieval result and the existence ratio Pj of the retrieved subject data j of the collection C of the retrieved subject data, $$M(C) = -\sum_{j=1}^{k} P^j \log_2 P^j$$

computes the expected information amount B (C, a) when the collection C is divided into partial collections C1, . . . , Cn based on the answer nodes a1, . . . , an as for the given question node a, by the following expression, $$B(C, a) = \sum_{i=1}^{n} \frac{|C_i|}{|C|} M(C_i)$$

and computes the expected value gain (C, a) of the acquired information of the respective question nodes, by the following expression, gain(C,a)=M(C)-B(C,a).

20. An information retrieval system as set forth in claim 19, in which said narrowing means makes the existence ratio Pj of the retrieved subject data j in the collection C, as the retrieval probability pj of the retrieved subject data rj that is computed by the following expression, by use of the number k of the retrieved subject data that is a retrieval result, the retrieved subject data r1, r2, . . . , rm that is the retrieval result, the retrieval times hj of the given retrieved subject data rj ($1 \leq j \leq m$), and the number of times vj the retrieval result appears at a lower hierarchy below a different answer node, $$p^j = \frac{h_j}{v_j \sum_{i=1}^{k} h_j}.$$

21. An information retrieval system as set forth in claim 19, in which said narrowing means obtains, from the hierarchical index stored in said index storing means, a question node that is a node positioned at the lowest hierarchy, of the common nodes in all the paths, and an answer node that is a node positioned at a lower hierarchy right beneath the question node, assuming a path starting from a leaf indexed to the retrieved subject data obtained as a retrieval result and tracing the nodes of hierarchical index up to the upper hierarchy, computes the expected value of the acquired information as for the respective obtained question nodes, presents to a user the question nodes in decreasing order of the expected value of the computed acquired information and the answer nodes corresponding to the respective question nodes, and according to a narrowing instruction entered by a user, creates a partial retrieval condition for retrieving only the lower hierarchy below the answer node selected by the narrowing instruction, in the hierarchical index, so to hand the same condition to said retrieval condition expression creating means, while said retrieval condition expression creating means
converts the retrieval condition into an expression processable by said retrieval executing means by use of the partial retrieval condition expression when receiving the partial retrieval condition expression from said narrowing means, in addition to creation of a retrieval condition expression based on the entered retrieval condition.

* * * * *